United States Patent
Golovashchenko

(10) Patent No.: US 9,500,304 B2
(45) Date of Patent: Nov. 22, 2016

(54) ASSEMBLY INCLUDING PARTS MADE OF DISSIMILAR METALS AND THE METHOD OF MANUFACTURING THE ASSEMBLY

(75) Inventor: Sergey Fedorovich Golovashchenko, Beverly Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 740 days.

(21) Appl. No.: 13/568,673

(22) Filed: Aug. 7, 2012

(65) Prior Publication Data

US 2014/0044899 A1    Feb. 13, 2014

(51) Int. Cl.
| | | |
|---|---|---|
| F16L 13/02 | (2006.01) | |
| F16L 25/00 | (2006.01) | |
| F16B 11/00 | (2006.01) | |
| B23P 11/00 | (2006.01) | |
| F16L 13/14 | (2006.01) | |
| F16L 13/007 | (2006.01) | |
| F16B 17/00 | (2006.01) | |

(52) U.S. Cl.
CPC ............ *F16L 13/02* (2013.01); *B23P 11/005* (2013.01); *F16B 11/002* (2013.01); *F16B 17/004* (2013.01); *F16L 13/007* (2013.01); *F16L 13/143* (2013.01); *F16L 25/0072* (2013.01); *Y10T 29/49803* (2015.01); *Y10T 29/49885* (2015.01); *Y10T 29/49908* (2015.01); *Y10T 29/49927* (2015.01); *Y10T 428/13* (2015.01)

(58) Field of Classification Search
CPC ... B23P 11/005; F16B 11/002; F16B 11/004; F16B 17/004; F16L 13/002; F16L 13/004; F16L 13/007; F16L 13/0254; F16L 13/0263; F16L 13/0272; F16L 13/0281; F16L 13/141; F16L 13/143; F16L 25/0072; F16L 25/10; Y10T 29/49803; Y10T 29/49925; Y10T 29/49927; Y10T 29/49885

See application file for complete search history.

(56) References Cited

U.S. PATENT DOCUMENTS

| | | | |
|---|---|---|---|
| 3,520,049 A | | 7/1970 | Lysenko et al. |
| 4,702,543 A | * | 10/1987 | Hager ........................ 439/271 |
| 5,966,813 A | | 10/1999 | Durand |
| 5,981,921 A | | 11/1999 | Yablochnikov |
| 5,983,478 A | * | 11/1999 | Dolan .................. B21D 26/14  29/419.2 |
| 6,099,045 A | * | 8/2000 | Pirona ....................... 285/256 |
| 6,104,012 A | | 8/2000 | Durand |
| 6,595,559 B1 | * | 7/2003 | Readman ................... 285/382 |
| 7,384,074 B2 | * | 6/2008 | He ............................ 285/256 |
| 7,513,025 B2 | * | 4/2009 | Fischer ..................... 29/419.2 |
| 2008/0155745 A1 | * | 7/2008 | Burr ...................... E03C 1/232  4/683 |
| 2008/0240850 A1 | | 10/2008 | Saha et al. |
| 2010/0052314 A1 | * | 3/2010 | Ishida et al. ............. 285/148.16 |

FOREIGN PATENT DOCUMENTS

WO    WO2008009573 A1 * 1/2008 ........... F16L 33/207

* cited by examiner

*Primary Examiner* — Christopher Besler
*Assistant Examiner* — Matthew P Travers
(74) *Attorney, Agent, or Firm* — Damian Porcari; Brooks Kushman P.C.

(57) ABSTRACT

A method of joining parts with an electromagnetic joining process and an assembly made according to the process. Seals are assembled to a first part and a second part is assembled over the first part and the seals. A lubricant is applied to the first part between the seals to preoccupy or partially fill the area within the joint to prevent moisture from penetrating into the joint and causing corrosion. A portion of the second part is deformed into recesses formed in the first part to join the first and second parts.

7 Claims, 3 Drawing Sheets

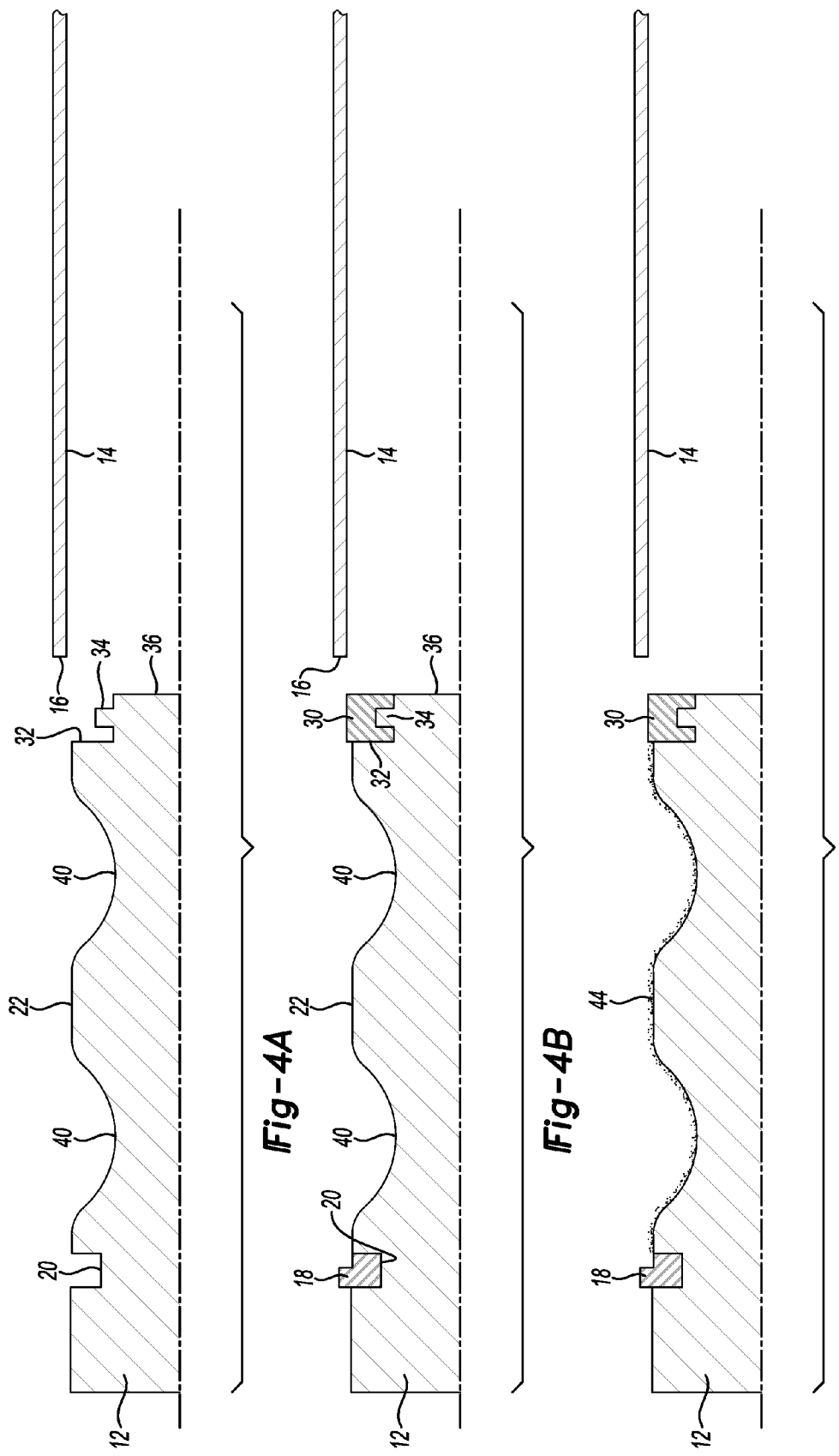

ASSEMBLY INCLUDING PARTS MADE OF DISSIMILAR METALS AND THE METHOD OF MANUFACTURING THE ASSEMBLY

TECHNICAL FIELD

This disclosure relates to joining parts made of dissimilar metals together with a pulsed electromagnetic welding process.

BACKGROUND

Electromagnetic welding techniques are known for joining parts together. However, joining dissimilar metals, for example steel and aluminum, together is generally to be avoided because of the risk of galvanic corrosion. Galvanic corrosion may occur if parts formed of different metals are contacted by an electrolyte.

One way to avoid galvanic corrosion is to electrically insulate the two metals from each other. Unless the parts are in electrical contact, no galvanic coupling is created. Preventing electrical contact can be done using a plastic insert or a protective plastic layer. For example, steel water pipes may be separated from copper-based fittings by an insulating insert. In another example, a coat of grease may be applied to separate aluminum from steel parts. Piping can be isolated by using a plastic pipe or by using a pipe made of metal that is internally coated or lined. However, applying substantial loads to the plastic part or coating should be avoided because these materials usually have low mechanical strength.

Another way to avoid galvanic corrosion is to keep the metals dry or shielded from ionic compounds (salts, acids, bases) that create an electrolyte when in an aqueous solution. For example, a metal part may be painted or encased in plastic or epoxy. Coating the two different metal parts with a protective paint or assembling an insert between the two parts may be effective but adds cost to the manufacturing process. Coatings or epoxy layers can be damaged over the life of the joint allowing galvanic corrosion to initiate.

Electrically insulating by adding plastic layers or inserts, shielding from ionic compounds and coating with protective paints are all approaches that add cost and process steps to the manufacturing process. Applying grease between the parts may work for a while but over an extended period of time the grease may wash off of the parts and the protection against galvanic corrosion may be lost.

The above problems and disadvantages and others are addressed by the disclosed method as summarized below.

SUMMARY

An electromagnetic joining process is used to connect an extruded tube over a mandrel. The pulsed electromagnetic joining process is based on high-voltage discharge of capacitors through an inductive coil and inducing electric current in the blank that is positioned next to the coil. Due to the electromagnetic forces, the blank is accelerated and formed into a plurality of grooves on the inner mandrel. The joining process strengthens the connection. The majority of the load is applied to the crimp—where extrusion material is formed into the grooves on the inner mandrel.

Enhanced corrosion resistance is provided by introducing elastic sealing elements to seal the joint. In order to improve corrosion protection even further, it is proposed to apply oil on the surface of the mandrel prior to joining. The oil preoccupies, or at least partially fills, the area within the joint where there is a possibility of moisture penetrating into the joint.

According to one aspect of this disclosure, a joining method is disclosed that comprises selecting a first part that defines a groove, a first receptacle and a second receptacle on opposite sides of the groove and selecting a second tubular part. A first seal is assembled to the first receptacle and a second seal is assembled to the second receptacle. The second part is assembled to the first part over the first and second seals and the groove. The second part is then deformed into the groove.

According to another aspect of the disclosure, the joining method may further comprise coating the first part between the first and second receptacle with a lubricant, or oil.

The first receptacle may be a recessed groove that extends around the first part. The second receptacle may be an end groove that extends around an end of the first part.

The first seal may include a stop lip that extends outwardly in a radial direction from the first part. The second part may be installed over the first part with the second part engaging the stop lip. The second receptacle may include a seal receiving recessed rib that is recessed in a radial direction inside an outer surface of the first part and wherein the second seal is installed over the seal receiving recessed rib.

A space defined between the first part and the second part. The space is sealed with the first and second seals on the first part engaging the second part at axially spaced locations on the second part.

The joining method may further comprise deforming the second part into the groove by pulsing an electromagnetic discharge through a coil.

According to another aspect of this disclosure, an assembly is provided that comprises a first part that defines a groove, a first receptacle and a second receptacle on opposite sides of the groove. A first seal is assembled to the first receptacle and a second seal is assembled to the second receptacle. A second tubular part is assembled to the first part over the first and second seals and the groove. The second tubular part has a deformed portion that is deformed radially inwardly into the groove in the first part.

According to other aspects of this disclosure relating to the assembly, the assembly may further comprise a lubricant on the first part between the first seal and the second seal that fills at least part of the space between the first and second parts and between the first seal and the second seal.

The first part may define a second groove that is axially spaced from the first groove and is disposed between the first receptacle and the second receptacle.

The first receptacle may be a recessed groove that extends around the first part. The second receptacle may be an end groove that extends around an end of the first part.

The first seal may include a stop lip that extends outwardly in a radial direction from the first part with the second part being disposed over the first part and the second part engaging the stop lip. The second receptacle may include a seal receiving recessed rib that is recessed in a radial direction inside an outer surface of the first part with the second seal being disposed over the seal receiving recessed rib. The first and second seals on the first part are oriented to engage the second part at axially spaced locations on the second part.

The above aspects of this disclosure and other aspects will be described with reference to the drawings in the following detailed description of the illustrated embodiment.

BRIEF DESCRIPTION OF THE DRAWINGS

FIGS. 4a-4e are a series of cross-sectional views that illustrate the steps of the method of joining the first and second parts together by pulsed electromagnetic joining.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
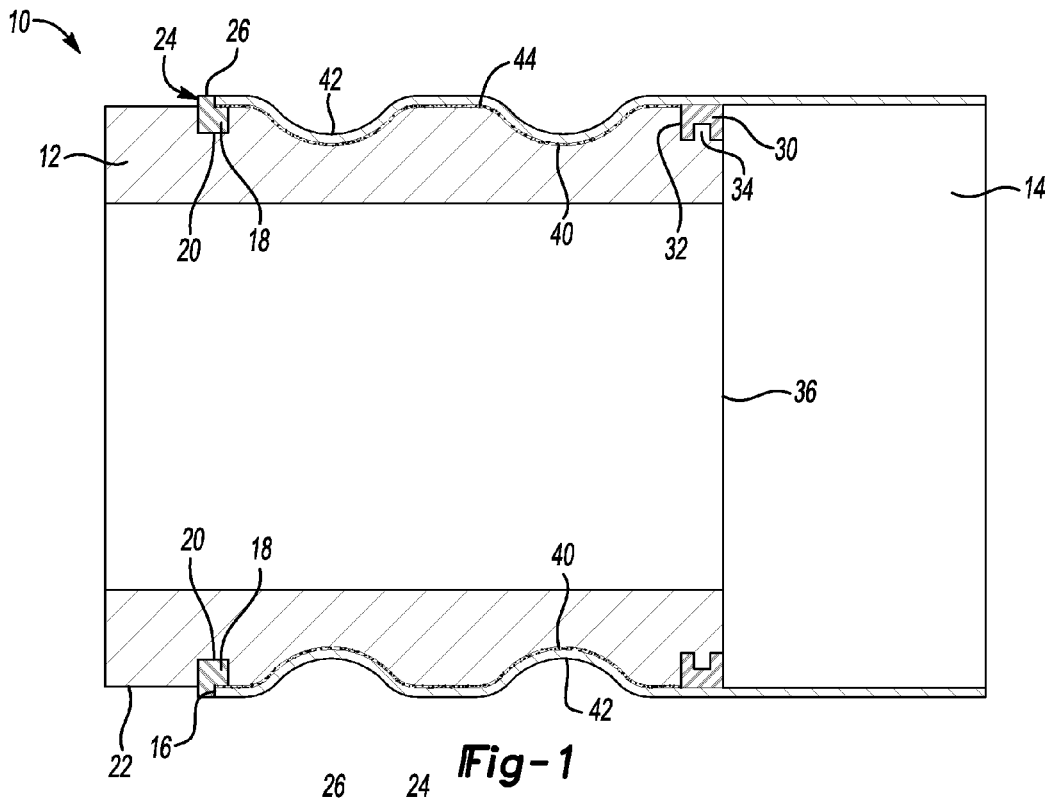
FIG. 1 is a diagrammatic cross-sectional view of an assembly made up of two parts that are joined together by a pulsed electromagnetic weld.
Figure 2:
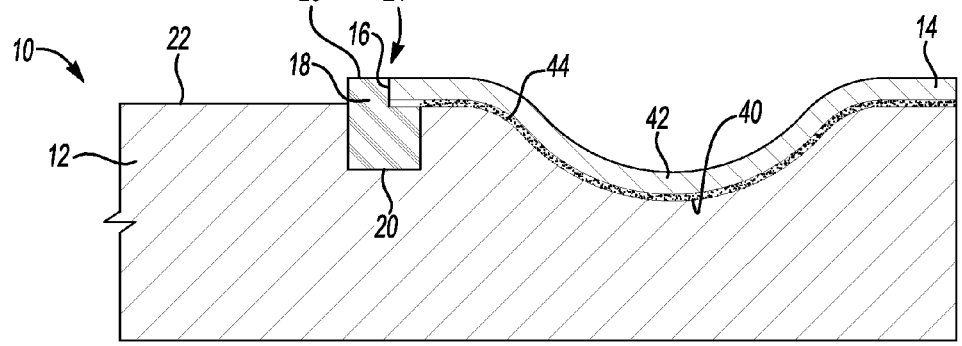
FIG. 2 is a fragmentary cross-sectional view showing a distal end of the second part engaging a stop lip of a first seal.
Figure 3:
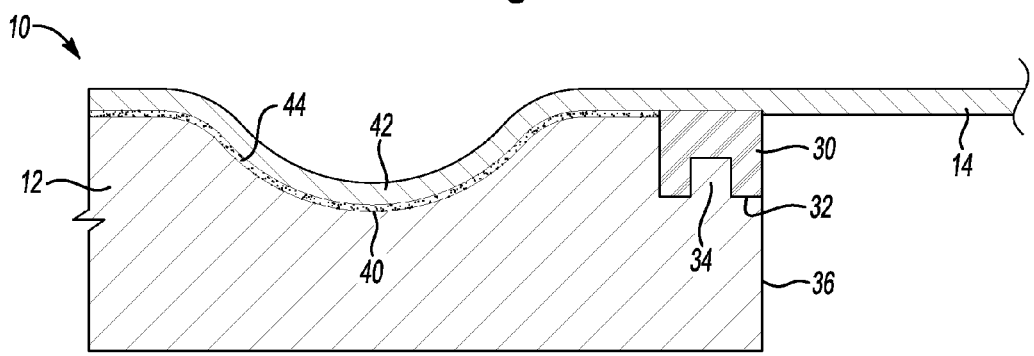
FIG. 3 is a cross-sectional view of the distal end of a first part and a second seal.

Referring to FIGS. 1-3, an assembly 10 is illustrated that includes a first part 12, for example an end fitting, and a second part 14, for example a tubular aluminum extrusion. The second part 14 defines an open end 16 in which the first part 12 is inserted.

A first seal 18 is assembled into a first receptacle 20, or groove, formed in an outer surface 22 of the first part 12. The first seal 18 and first receptacle 20 are disposed at an intermediate location 24 on the first part 12. The first seal 18 includes a stop lip 26 that extends outwardly from the first receptacle 20 and outboard of the outer surface 22 of the first part 12.

A second seal 30 is assembled into a second receptacle 32. The second receptacle 32 is recessed inside the outer surface 22 of the first part 12. A rib 34 may be provided in the second receptacle 32 to better retain the second seal 30 within the second receptacle 32. The second receptacle 32 is formed at a distal end 36 of the first part 12.

The first part 12 defines two recesses 40 that are adapted to receive an inwardly deformed portion 42 of the second part 14. While two recesses 40 and inwardly deformed portions 42 are shown in FIG. 1, it should be understood that one or more recesses 40 and inwardly deformed portions 42 may be provided. The recesses 40 are shown as concave rings that extend about the first part 12. The first part 12 and second part 14 may be circular, square, rectangular, or may have an irregular cross section.

A lubricant 44 may be provided between the first part 12 and second part 14 and between the first seal 18 and second seal 30. The lubricant is provided to fill interstitial space between the first part 12 and second part 14 and thereby prevent water or other foreign substances from entering the joint between the first part 12 and the second part 14.

If no lubricant is applied between the first part 12 and second part 14 and between the first seal 18 and second seal 30, the electromagnetic pulse may cause the two parts to weld together in the recesses 40.

Figure 4D:
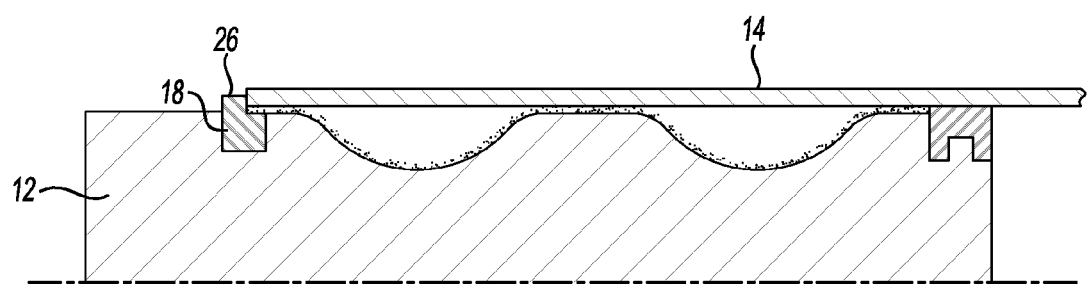

Referring to FIGS. 4a-e, the process for assembling the first and second parts together to form an assembly 10 is illustrated in a sequence. In FIG. 4a, a first part 12 and second part 14 are selected. The first part 12 includes a first receptacle 20 and a second receptacle 32 that are formed as grooves in the outer surface 22 of the first part 12. The second receptacle 32 is formed adjacent the distal end 36 of the first part 12. Two concave recesses 40 are provided between the first receptacle 20 and the second receptacle 32. The second part 14 is a tubular aluminum extrusion that defines an open end 16.

Referring to FIG. 4b, a first seal 18 is shown assembled into the first receptacle 20 defined by the first part 12. A second seal 30 is assembled into the second receptacle 32 and is attached to the rib 34.

Referring to FIG. 4c, the first part 12 is shown with the first seal 18 and the second seal 30 installed on the first part 12. A lubricant 44, such as an oil based composition that has corrosion resistant properties, is applied to the first part 12 between the first seal 18 and the second seal 30.

Referring to FIG. 4d, the second part 14 is shown assembled over the first part 12 with the second part engaging the stop lip 26.

Figure 4E:
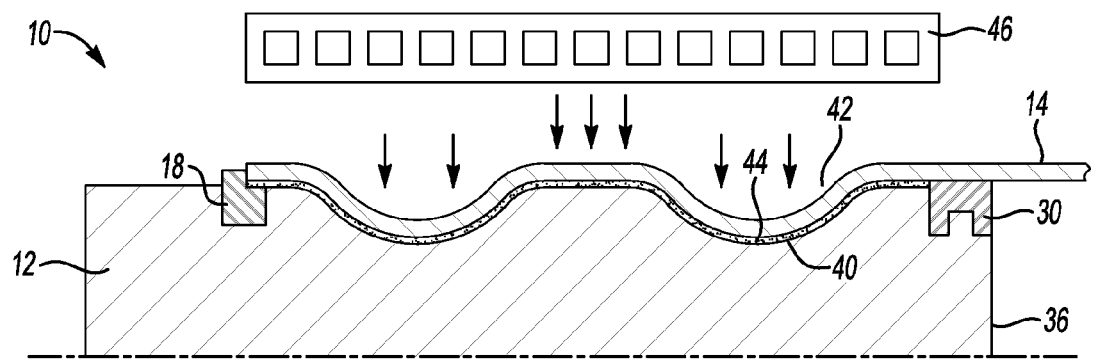

Referring to FIG. 4e, the assembly 10 is shown in conjunction with a coil 46 that is used to pulse an electromagnetic discharge. The coil 46 is pulsed to drive a portion of the second part 14 into the recesses 40 to form an inwardly deformed portion 42 of the second part 14. The inwardly deformed portion 42 of the second part 14 locks the second part 14 to the first part 12 thereby completing the process of forming the assembly 10.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A joining method comprising:
   selecting a first part that defines a groove, a first receptacle and a second receptacle including a rib that is recessed in a radial direction inside an outer surface of the first part;
   selecting a second tubular part;
   installing a first seal, including a lip that extends outwardly in a radial direction from the first part, to the first receptacle and a second seal over the rib;
   assembling the second part to the first part over the groove between the second seal and a portion of the first seal such that the lip extends axially beyond the second part and maintains an axial position of the second part relative to the first part within the groove;
   coating the first part with a corrosive-resistant lubricant between the first and second seals; and
   deforming a portion of the second part into the groove.

2. The joining method of claim 1 wherein the first receptacle is a recessed groove that extends around the first part.

3. The joining method of claim 2 wherein the second receptacle is an end groove that extends around an end of the first part.

4. The joining method of claim 1 wherein the second receptacle is an end groove that extends around an end of the first part.

5. The joining method of claim 1 further comprising:
sealing a space defined between the first part and the second part with the first and second seals on the first part engaging the second part at axially spaced locations on the second part.

6. A method comprising:
respectively assembling first and second seals to first and second receptacles separated by a groove, the first seal having a lip radially outward of a first part that defines each receptacle and the groove;
lubricating the first part between the receptacles; and
deforming a second part into the groove between each seal, the lip extending axially beyond the second part and maintaining relative axial position between the parts within the groove.

7. A joining method comprising:
assembling a first seal, having a lip that extends outwardly in a radial direction from a first part, to a first receptacle and a second seal to a second receptacle wherein the receptacles are defined on the first part having an oil disposed between the receptacles and separated by a groove;
assembling a second part over the second seal and a portion of the first seal such that the lip extends axially beyond the second part and maintains an axial position of the second part relative to the first part within the groove;
pulsing an electromagnetic discharge of a coil such that a portion of the second part is deformed into the groove.

* * * * *